United States Patent
Corbett et al.

(10) Patent No.: US 10,921,393 B2
(45) Date of Patent: Feb. 16, 2021

(54) MAGNETOMETER CHIP SENSOR ARRAY FOR READING A MAGNETIC PUF, INCLUDING A MAGNETIC PUF FILM OR TAPE, AND SYSTEMS INCORPORATING THE READER

(71) Applicant: LEXMARK INTERNATIONAL, INC., Lexington, KY (US)

(72) Inventors: William Pohl Corbett, Lexington, KY (US); Gary Allen Denton, Lexington, KY (US); James Paul Drummond, Georgetown, KY (US); Keith Bryan Hardin, Lexington, KY (US); Kelly Ann Killeen, Lexington, KY (US); Randal Scott Williamson, Georgetown, KY (US)

(73) Assignee: LEXMARK INTERNATIONAL, INC., Lexington, KY (US)

(*) Notice: Subject to any disclaimer, the term of this patent is extended or adjusted under 35 U.S.C. 154(b) by 0 days.

(21) Appl. No.: 16/429,710

(22) Filed: Jun. 3, 2019

(65) Prior Publication Data
US 2019/0369174 A1 Dec. 5, 2019

Related U.S. Application Data

(60) Provisional application No. 62/679,365, filed on Jun. 1, 2018.

(51) Int. Cl.
| | | |
|---|---|---|
| *G01R 33/12* | (2006.01) | |
| *G01R 33/00* | (2006.01) | |
| *H04L 9/32* | (2006.01) | |
| *G01R 33/02* | (2006.01) | |
| *G06K 19/06* | (2006.01) | |
| *B41J 2/175* | (2006.01) | |
| *G03G 21/18* | (2006.01) | |
| *G06K 7/08* | (2006.01) | |
| *G01R 33/07* | (2006.01) | |

(52) U.S. Cl.
CPC ........ *G01R 33/1276* (2013.01); *B41J 2/1755* (2013.01); *G01R 33/0094* (2013.01); *G01R 33/0206* (2013.01); *G01R 33/072* (2013.01); *G03G 21/1896* (2013.01); *G06K 7/082* (2013.01); *G06K 19/06196* (2013.01); *H04L 9/3278* (2013.01)

(58) Field of Classification Search
None
See application file for complete search history.

(56) References Cited

U.S. PATENT DOCUMENTS

| | | | | |
|---|---|---|---|---|
| 9,608,634 | B1* | 3/2017 | Denton | ................ B41J 2/17546 |
| 2017/0104600 | A1* | 4/2017 | Booth | ................... H04L 9/3278 |
| 2017/0242660 | A1* | 8/2017 | Katoh | ..................... H04L 9/003 |

* cited by examiner

*Primary Examiner* — Kristy A Haupt

(57) ABSTRACT

A system for use in authentication processes is described comprising a physical unclonable function ("PUF"), a substrate, a plurality of magnetized particles randomly dispersed in the substrate, a PUF reader constructed using multiple discrete magnetometer chips that have magnetic field sensors, placed on a circuit card in an array with a sufficient center to center spacing between sensing elements of adjacent magnetometer chips, wherein the PUF reader measures the magnetic field data at multiple locations in close proximity to the magnetized particles. The measured magnetic field data may be compared to previously enrolled data to assess authenticity.

38 Claims, 5 Drawing Sheets

MAGNETOMETER CHIP SENSOR ARRAY FOR READING A MAGNETIC PUF, INCLUDING A MAGNETIC PUF FILM OR TAPE, AND SYSTEMS INCORPORATING THE READER

CROSS REFERENCES TO RELATED APPLICATIONS

None.

BACKGROUND

1. Field of the Invention

This invention relates generally to sensor arrays for measuring magnetic fields in a PUF fingerprint, and more particularly, to a PUF reader device that incorporates the sensor arrays.

2. Description of the Related Art

U.S. Pat. No. 9,553,582, incorporated herein by reference, discloses a PUF (Physical Unclonable Function) that contains magnetic particles, which generate a complex magnetic field near the surface of the PUF part. This magnetic field may be measured along a path and data corresponding to the magnetic field components recorded for later comparison and authentication of the PUF part. U.S. Pat. No. 9,608,828, incorporated herein by reference, discloses the advantages of magnetizing the feed stock prior to the injection molding process to achieve a random orientation of the magnetization directions. In these patents, flakes of an NdFeB alloy are cited as the preferred magnetic particles, however other magnetic materials, alloys, and particle shapes may be employed. These flakes are typically about 35 microns thick with irregular shapes varying in width from 100-500 microns but may vary substantially from these ranges. The NdFeB alloy is not easily magnetized because it has an intrinsic coercivity of around 9,000 Oersted. However, once magnetized, the alloy has a residual induction of about 9,000 gauss, and the random locations and magnetic orientations of the particles and flakes produce sharp peaks in the magnetic field strength of ±10-30 gauss when measured at a distance of about 0.5 mm from the surface of the PUF.

The magnetic PUF technology can be applied to create PUF tags for authenticating passports, secure ID cards, and other non-rotating objects. For these applications, the complex magnetic field structure near the surface of a magnetic PUF, measured over a non-rotating 2-dimensional region can serve as a magnetic "fingerprint." A low cost means of authenticating the magnetic PUF fingerprint is needed for non-rotating systems that read stationary or translating PUFs. In a rotating PUF sensor system a single sensor can measure the magnetic profile values at multiple angles around a circular path through the PUF fingerprint. This is possible using a single 3-axis Hall effect sensor because the rotation of the PUF element enables the fingerprint to be sampled at a high spatial frequency using a single magnetometer chip. For non-rotating PUF systems with no moving parts, the sampling of the magnetic fingerprint at multiple locations requires multiple magnetic field sensors, or movement of the PUF with respect to the sensors (similar to a credit-card swipe). A resolution of at least 0.1 gauss is preferred given the expected signal amplitudes generated by PUF samples.

SUMMARY OF THE INVENTION

As shown in FIG. 1, the Z-component of a representative magnetic PUF fingerprint does not change significantly over 0.1-0.2 mm of travel along the surface of the PUF. This is because the Hall-effect sensor or sensing element in this example is about 0.5-1.0 mm above the magnetized flakes generating the magnetic field. An economical array of Hall-effect sensors for sampling and validating the magnetic fingerprint would have the sensors nominally spaced approximately at least 0.4 mm apart for the flake sizes discussed in the related art. The average flake length for this approximation is 0.3 mm. The ratio of the minimum separation to particle length is approximately 1.33.

A low cost PUF fingerprint reader can be constructed using multiple discrete 3-axis magnetometer chips. A 1.46 mm×1.46 mm wafer level chip size package, for example, could be placed on a circuit card with a 2 mm center-to-center spacing. This will enable the placement of a 5×5 array of 3-axis Hall-effect sensors within a 10 mm×10 mm window in this example, which would result in the sensing locations spanning an 8 mm×8 mm window for such an arrangement.

BRIEF DESCRIPTION OF THE DRAWINGS

Figure 1:
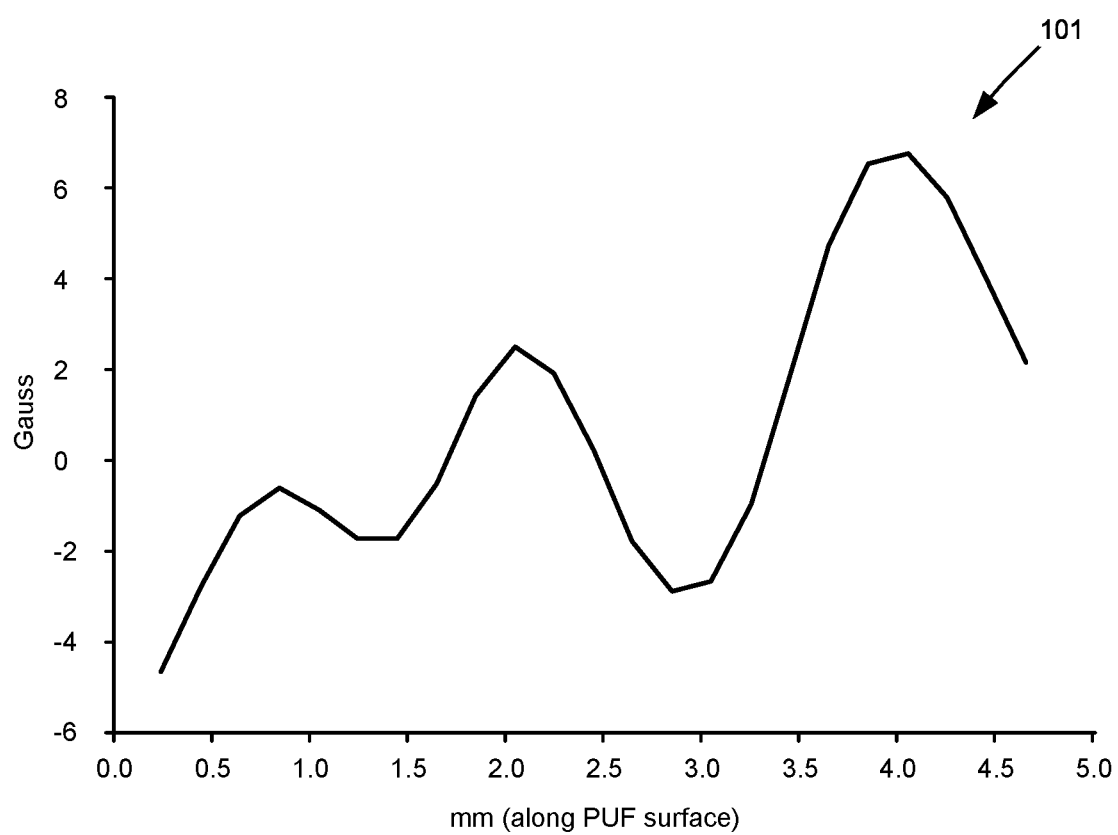

Having thus described the invention in general terms, reference will now be made to the accompanying drawings, which are not necessarily drawn to scale, and wherein:

FIG. 1 shows the Z-component of a representative magnetic PUF fingerprint.

Figure 2:
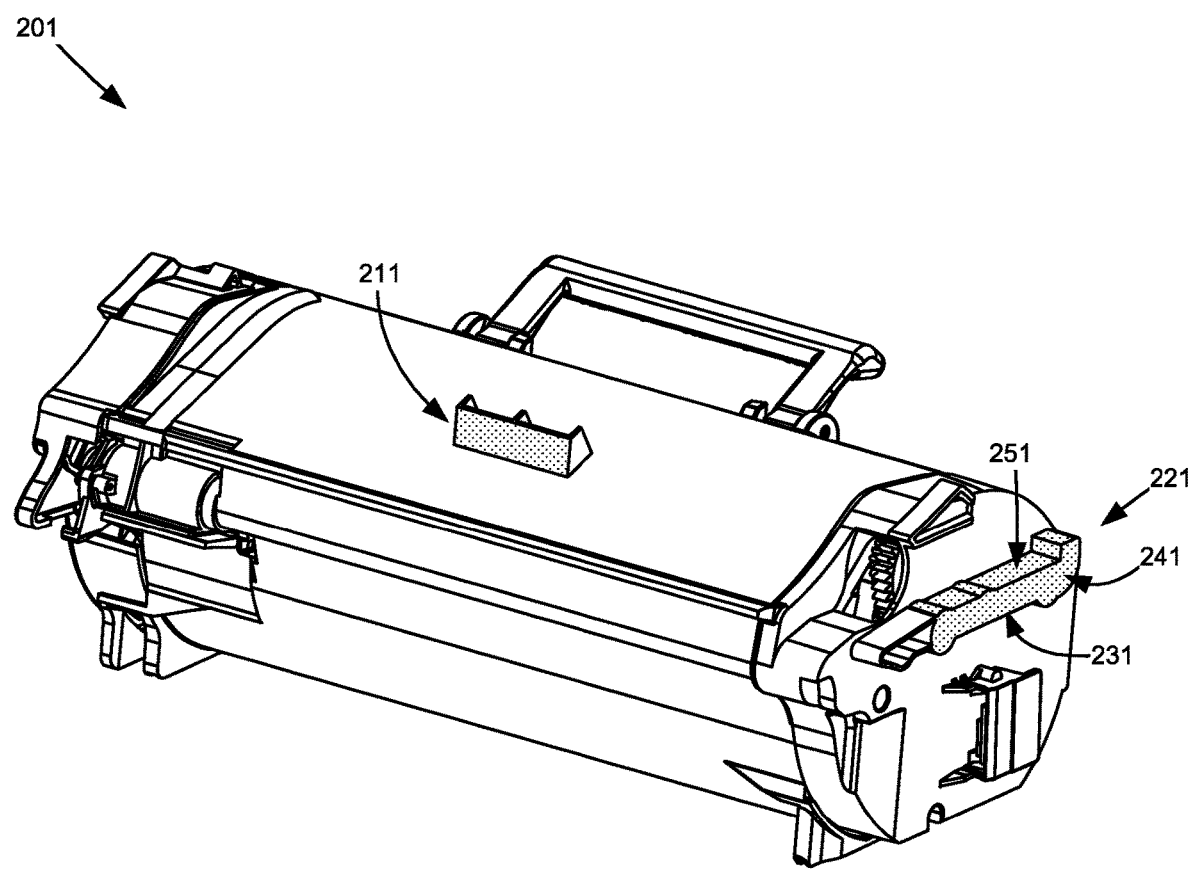

FIG. 2 shows a printer cartridge with PUF material attached.

Figure 3:
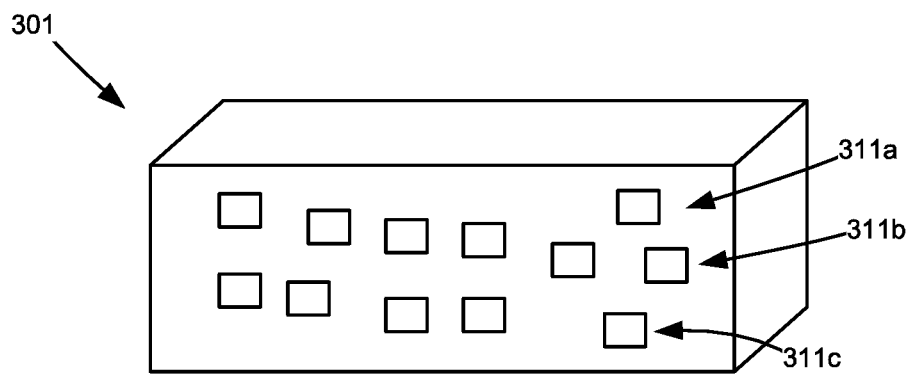

FIG. 3 shows a reader device with a sensor array.

Figure 4:
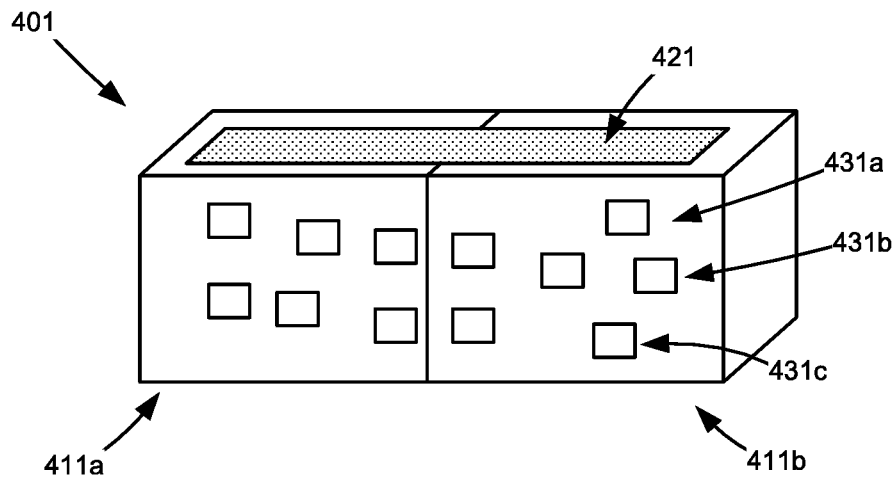

FIG. 4 shows a reader element that has two sections.

Figure 5:
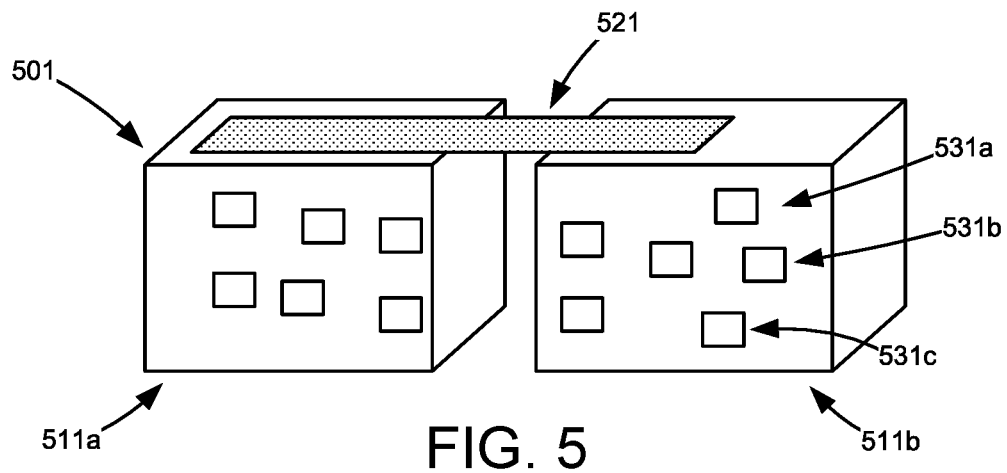

FIG. 5 shows a reader with two separated sections.

Figure 6:
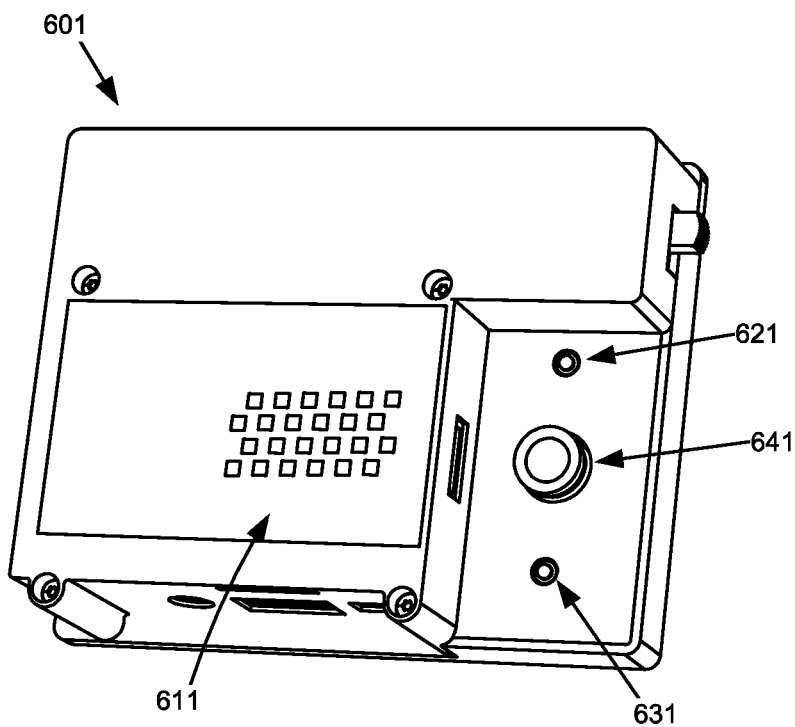

FIG. 6 shows a bottom isometric view of a PUF reader device.

Figure 7:
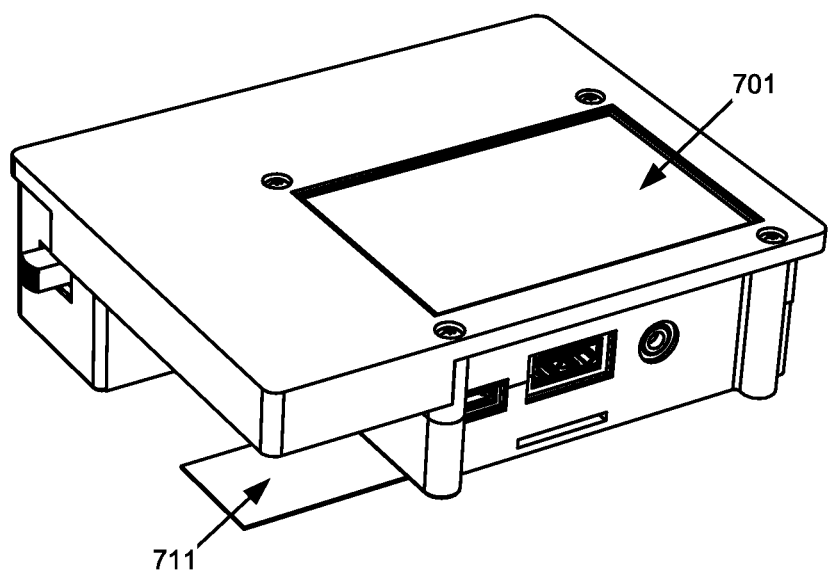

FIG. 7 shows a top isometric view of a PUF reader device adjacent to a PUF.

Figure 8:
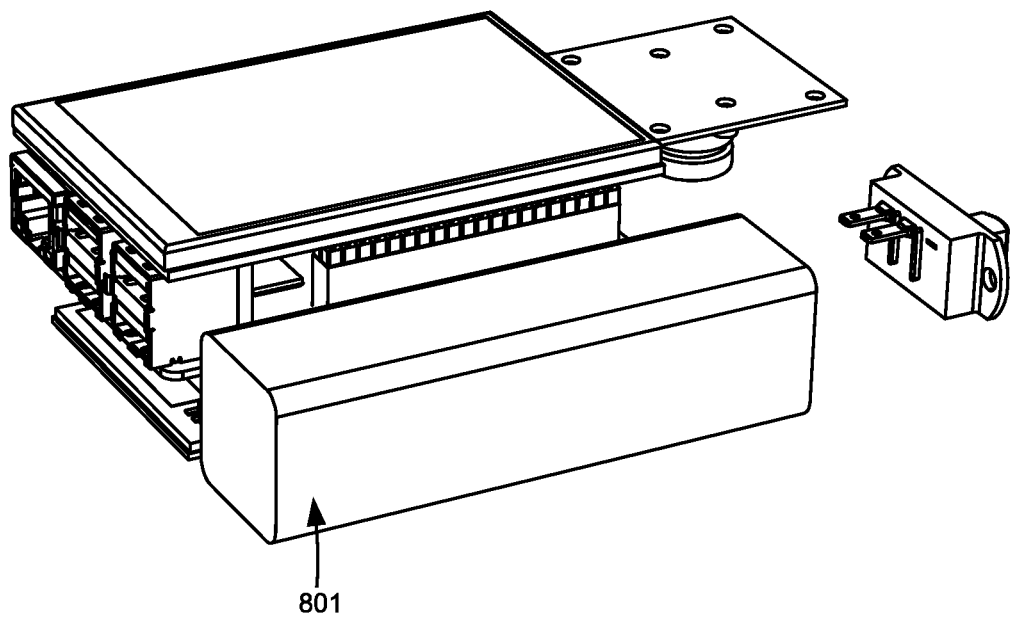
Figure 9:
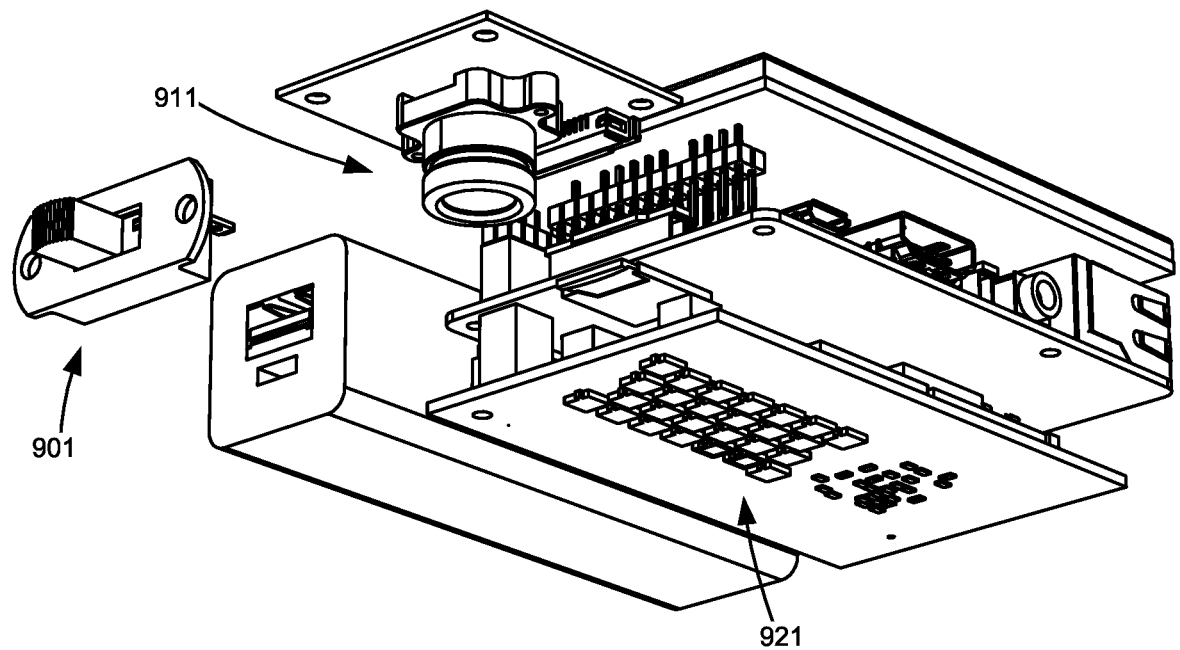

FIGS. 8 and 9 show exploded views of a PUF reader device.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology, terminology and dimensions used herein is for the purpose of description and should not be regarded as limiting. As used herein, the terms "having," "containing," "including," "comprising," and the like are open ended terms that indicate the presence of stated elements or features, but do not preclude additional elements or features. The articles "a," "an," and "the" are intended to include the plural as well as the singular, unless the context clearly indicates otherwise. The use of "including," "comprising," or "having" and variations thereof herein is meant to encompass the items listed thereafter and equivalents thereof as well as additional items. Terms such as "about" and the like are used to describe various characteristics of an object, and such terms have their ordinary and customary meaning to persons of ordinary skill in the pertinent art. The dimensions of the magnetic particles, separations between particles and sensor locations are interrelated and can be proportionally scaled with respect to each other to provide different dimensional solutions.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout the views.

One of the challenges of using multiple sensor chips is the manufacturing tolerances on the exact physical locations of the Hall effect sensor elements within the assembled PUF read head. The chip packages can typically be placed with ±0.05 mm accuracy. Further, the sensing elements have ±0.05 mm tolerances within the chip packages for each dimension. Therefore, the uncertainty in the relative measurement location of a given sensor is ±0.1 mm. Uncertainty of the relative x and y spacings can be reduced by x-raying the chip array to measure the sensor element positions in X-Y coordinate directions. A less expensive method would be to use a calibration fixture to accurately scan a PUF object over an X-Y coordinate window that is larger than the nominal distance (center-to-center) between the sensor chips. The overlapping data from adjacent sensors can be used to determine the relative locations of the sensor elements.

A computer simulation was conducted to investigate how many sensors are required in an array to achieve a desire confidence level that the test result is not a false positive. In the simulations, the fingerprint enrollment data was recorded over the PUF surface at 0.1 mm intervals in both the X and Y coordinate directions. Further, the height Z of each sensor chip varies randomly ±0.05 mm. When a PUF read head array is brought into contact with an enrolled PUF tag to measure its fingerprint, the location of the validation sensor array is assumed to be aligned with the enrollment data window within ±1 mm. A correlation algorithm testing the simulated validation readings against the enrollment fingerprint map by calculating the Pearson correlation R-value for each component of the magnetic field and multiplying the components together, i.e., $R_{xyz}=R_x*R_y*R_z$. This correlation is preferred for multiple array locations within the fingerprint enrollment data. Any other suitable statistical analysis could be used to compare the validation readings to the enrollment values.

Typically, when the magnetic sensors are more than 1 mm apart, the magnetic field values at each sensor location essentially becomes independent variables. If only one sensor is used to authenticate the magnetic field, the probability is high that a match to that sensor's magnetic field readings can be found along the X and Y coordinate dimensions in the enrollment data. With multiple magnetic sensors separated by known distances along the X and Y coordinate dimensions, the probability of finding a false positive match is reduced. If the probability were to be only reduced to 0.01, then a counterfeiter could produce hundreds of PUF parts and test the set to collect the ones that happened to be accepted by the validation algorithm. A much lower probability of a false positive outcome is needed to make this counterfeit strategy cost prohibitive.

To assess the probability of a counterfeiter producing a random match, hundreds of simulations were run for magnetic PUF readers using 4, 5, 6, 7, 8, 12, 16, 20, and 24 magnetic sensors (3-axis) to generate estimates of the probability of a random match (a false positive). In these simulations the magnetic sensors were nominally spaced 2 mm apart. Statistical analysis of the hundreds of validation scores showed that an array of 4 sensors (3-axis) would produce a passing test result about 8.20E-02, i.e., 8.20% of the time. This arrangement does not provide a high confidence level that the "passed" item is authentic. Increasing the number of sensor locations to 5 would produce a false positive about 4.20% of the time. Table 1 shows the probability of generating validation scores above 0.7 using the Pearson correlation R-value, $R_{XYZ}$, when testing random PUF parts. Analysis of the log of the probabilities confirms that it is a linear function of the number of sensors.

One approach to decreasing a random match without increasing the number of sensors is if the PUF reader measures the fingerprint, moves at least 0.5 mm and takes a second measurement. The probability that both authentication scores are above 0.7 using the Pearson correlation R-value are shown in the third column. Statistical analysis showed that an array of 4 sensors (3-axis) would produce a passing test result about 0.672% of the time if a second measurement was taken. While the probability of passing a random PUF part are significantly reduced, this places a burden on the user to move the reader and take a second measurement of the magnetic fingerprint. Similarly, mechanical means could be employed to automatically shift the PUF reader sensor array by 1 mm at an added cost.

TABLE 1

| # Sensors | Probability (Pearson Correlation R-Value score > 0.7) | Probability (Two Pearson Correlation R-Value scores > 0.7) |
|---|---|---|
| 4 | 8.20E−02 | 6.72E−03 |
| 5 | 4.20E−02 | 1.76E−03 |
| 6 | 8.00E−03 | 6.40E−05 |
| 7 | 1.30E−03 | 1.69E−06 |
| 8 | 8.00E−05 | 6.40E−09 |
| 12 | 4.00E−09 | 1.60E−17 |
| 16 | 1.20E−12 | 1.44E−24 |
| 20 | 4.30E−18 | 1.85E−35 |
| 24 | 1.10E−21 | 1.21E−42 |

Given the low cost of magnetic sensor chips, the preferred implementation would be to use a PUF reader with more sensor chips in the reader head to achieve the same confidence level as measured here by the Pearson correlation R-value. It should be noted that if the magnetic sensors do not perform measurements of all three orthogonal axes of the magnetic field, that one would need additional sensor measurements to compensate for the reduced information coming from each sensor.

Referring to FIG. 2, a printer cartridge 201 is shown with PUF material attached on features 211 and 221. This PUF material can be made in various thicknesses from a fixed block to a thin tape. The PUF may be applied onto the surface or molded into the supply item.

A reader device 301 is shown in FIG. 3 with multiple sensors 311a, 311b, and 311c are shown, for example, that come in close proximity to the PUF surfaces. The number of sensor locations, a total of twelve (12) are shown on the reader device in FIG. 3, is determined by the level of security needed for the application that can provide a secure authentication of the printer cartridge, in this instance.

The reader may contain an array of sensors arranged on a flat surface that may be in any pattern. The sensors must be nominally spaced a minimum distance apart to give significantly different field values. A preferred separation would be approximately 1 mm, but this distance is not limiting. The accuracy of each sensors known relative location in the sensor array is necessary as described above. The preferred ratio of the spacing to the particle length is 3.33, but this ratio is not limiting.

The reader in FIG. 3 could be used for both PUFs attached at 211 and 221 in FIG. 2. The reader is not limited to a specific surface, however. The PUF at 221 has three surfaces available for reading (bottom 231, side 241, and top 251). Moreover, the reader could wrap around the three sides as long as their relative positions are known/predetermined from the sensor calibration.

As discussed above, the number of sensors can be reduced if more locations are measured by discrete movements of the sensors. This can be done by adding an actuation system to the reader, whether mechanical or electromechanical, for example.

FIG. 4 shows a reader element that has two sections, 411a and 411b. Each section has an array of sensors, such as, e.g., 431a, 431b, and 431c that can be located adjacent if the sections abut as in FIG. 4 or separated by a fixed distance determined by a connecting element 521 as in FIG. 5, which shows two separated sections, 511a and 511b. Each separated section has an array of sensors, such as, e.g., 531a, 531b, and 531c. The adjacent mode in FIG. 4 has 12 sensor locations. If both sets of sensor faces are allowed to move during the authentication measurement a distance greater than the minimum separation distance from the adjacent mode in FIG. 4 then this adds another 12 sensor locations, thus increasing the security level.

An example embodiment of a reader with two sections is that on a printer for a cartridge with a magnetic PUF that is inserted and removed by the user. A simple mechanical cam or lever action as is known to persons of ordinary skill in the art can push the sections together during the forward motion and apart with reverse motion. Another embodiment would be to use the cover door of a printer to actuate the assembly between adjacent, FIG. 4, and separated, FIG. 5.

Referring to FIG. 6, a PUF reader device 601 that may incorporate the reader elements of FIGS. 3, 4, and 5 is shown. A sensor array 611 is positioned on the bottom of the reader device 601. The sensor array 611 may be potted with epoxy resin or other polymer material to protect it from interference/damage by static electricity, dirt, or other factors. As shown in FIG. 7, by positioning the array on the bottom of the device, it may be placed in close proximity (contact) to a PUF 711. In FIG. 7, the PUF element is a film or tape, that is made by extrusion processes, and is preferably a thickness between is 0.05 mm to 1.50 mm. With a suitable adhesive backing (not shown), a section of PUF tape can be applied to the surface of an element to be identified. However, other PUF elements may be used instead of a tape. Further, the PUF element may be used in conjunction with a local, associated non-volatile memory, wherein the non-volatile memory contains magnetic field profile data measured from the magnetized particles. The magnetic field profile data could also be stored online or in a cloud location for later access. Further, data stored online or in the cloud location may correspond to bar code or QR code data use to the select the associated enrollment data.

The magnetized particles may contain neodymium and iron and boron, or other compounds such as samarium and cobalt, or any other magnetic materials that would produce a measurable magnetic field.

The PUF reader device 601 may have a camera or other viewing element 641, to assist in positioning the device, read a Quick Response ("QR") code or other identification mark, orient the device with respect to fiducials, or otherwise provide an optical orientation of the PUF 711. A viewing display, 701, allows the user to view the image captured by the camera lens. The viewing display, 701, may also be a touchscreen for operation of the PUF reader device 601. Lighting elements, 621 and 631, such as LED or other appropriate lighting, illuminate the camera image.

The image sensor may be a complementary metal-oxide-semiconductor (CMOS) or a semiconductor charge-coupled device (CCD) or other similar device to measure an image or optical reflectance from the PUF material.

Optionally, a viewing element, lighting, and display can be removed, and physical features such a guide edges (not shown), or other appropriate element, can be used to orient the PUF reader device 601 and the PUF 711.

The PUF reader device, as shown in the exploded views in FIGS. 8 and 9 can be either battery powered 801 or other power supply.

We claim:

1. A system comprising:
   a physical unclonable function ("PUF") comprising
      a substrate;
      a plurality of magnetized particles randomly dispersed in the substrate;
   a PUF reader constructed using multiple discrete magnetometer chips that by definition have magnetic field sensors, placed on a circuit card in an array with a sufficient center to center spacing between sensing elements of adjacent magnetometer chips,
   wherein the PUF reader measures the magnetic field data at multiple locations in close proximity to the magnetized particles.

2. The system of claim 1 wherein the particles are dispersed in a polymer matrix then magnetized prior to formation of the final substrate.

3. The system of claim 1 wherein the sensors are multi-axis sensors.

4. The system of claim 1 wherein the sensors are three-axis Hall-effect sensors.

5. The system of claim 1 with 0.2 to 5.0 mm center to center spacing of the magnetometer chips.

6. The system of claim 1 with 0.2 to 1.0 mm center to center spacing of the magnetometer chips.

7. The system of claim 1 with an array of magnetometer chips arranged in a pattern.

8. The system of claim 7 with an array of at least six 3-axis magnetometer chips.

9. The system of claim 8 with a 5×5 array of magnetometer chips.

10. The system of claim 8 with a 4×6 array of magnetometer chips.

11. The system of claim 10 with two additional magnetometer chips.

12. The system of claim 1 where the PUF can be made in various thicknesses from a block to a film or tape.

13. The system of claim 12 where the film or tape is a thickness of 0.05 mm to 1.50 mm.

14. The system of claim 1 where the PUF has more than one surface that is read for authentication.

15. The system of claim 14 where the reader wraps around the surfaces of the PUF.

16. The system of claim 1 where the reader is static with respect to the PUF during measurement of magnetic values.

17. The system of claim 16 where the reader measures the magnetic field data from the magnetized particles at multiple discrete locations.

18. The system of claim 16 where the sensors in the reader are at discrete locations with respect to the other sensors in the array, and measure the magnetic field data from the magnetized particles at random locations.

19. The system of claim 16 where the reader measures the PUF signature at multiple discrete locations.

20. The system of claim 1 where the reader is actuated, translated, or otherwise moved during the reading to enable sensing at a plurality of relative positions of the array with respect to the PUF.

21. The system of claim 20 wherein the reader is motorized and swipes across a PUF strip.

22. The system of claim 1 where the system is part of a printer and printer cartridge with a PUF material attached on a flat surface.

23. The system of claim 1 where the system is part of a printer and printer cartridge with a PUF material attached on a non-flat surface.

24. The system of claim 1, further comprising a non-volatile memory, wherein the non-volatile memory contains magnetic field data measured from the magnetized particles close to the PUF surface during an enrollment process.

25. The system of claim 24, wherein the magnetic field data is encrypted.

26. The system of claim 1, wherein the magnetized particles contain neodymium and iron and boron.

27. The system of claim 1, wherein the magnetized particles contain samarium and cobalt.

28. The system of claim 1, wherein the reader has two sections, and each section of the reader with an array of sensors can be located adjacent to each other or separated from each other by a fixed distance.

29. The system of claim 28 wherein the sections use a cam action to push together during the forward motion and apart with reverse motion.

30. The system of claim 1 wherein the reader has relative positions of the measurement locations stored as calibration data.

31. The system of claim 1 where the sensor array is potted with epoxy resin or other polymer to protect it from interference by static electricity, dirt, moisture, or other factors.

32. The system of claim 1 with an image sensor such as a complementary metal-oxide-semiconductor (CMOS) or a semiconductor charge-coupled device (CCD) or other similar device to measure an image or optical reflectance from the PUF material.

33. The system of claim 32 wherein the pixelated amplitudes of the image are compared to and matched with the enrolled image.

34. The system of claim 32 wherein the image sensor is used to locate and orient the magnetic reading to the PUF material.

35. The system of claim 1 wherein a known magnetic signal at a particular location is used as a fiducial to aid in determining when the magnetic and/or optical signal should be captured.

36. The system of claim 1 with a bar code or QR code reader.

37. The system of claim 1 where the PUF is actuated, translated, or otherwise moved during the reading, similar to a manual swipe reader used in credit card-type readers.

38. A PUF reader comprising multiple discrete magnetometer chips that by definition have sensors, placed on a circuit card in an array with a sufficient center to center spacing between sensing elements of adjacent magnetometer chips to detect discrete magnetic field data from magnetized particles.

\* \* \* \* \*